US012508204B2

(12) United States Patent
Herbst et al.

(10) Patent No.: US 12,508,204 B2
(45) Date of Patent: Dec. 30, 2025

(54) CHEST COMPRESSION SYSTEM RETAINER WITH SHOULDER BRACE FOR USE WITH A PATIENT TRANSPORT APPARATUS

(71) Applicant: Stryker Corporation, Kalamazoo, MI (US)

(72) Inventors: Cory P. Herbst, Shelbyville, MI (US); Michael J. Hernandez, Portage, MI (US); Alison Adams Zdan Shields, Portage, MI (US); James K Galer, Byron Center, MI (US); Kevin M. Patmore, Plainwell, MI (US); Brandon David Naber, Portage, MI (US)

(73) Assignee: Stryker Corporation, Portage, MI (US)

( * ) Notice: Subject to any disclaimer, the term of this patent is extended or adjusted under 35 U.S.C. 154(b) by 824 days.

(21) Appl. No.: 17/844,355

(22) Filed: Jun. 20, 2022

(65) Prior Publication Data

US 2023/0190575 A1 Jun. 22, 2023

Related U.S. Application Data

(60) Provisional application No. 63/291,692, filed on Dec. 20, 2021.

(51) Int. Cl.
*A61H 31/00* (2006.01)
*A61G 1/044* (2006.01)

(52) U.S. Cl.
CPC .......... *A61H 31/006* (2013.01); *A61G 1/044* (2013.01); *A61H 2201/0107* (2013.01);
(Continued)

(58) Field of Classification Search
CPC .......... A61H 31/006; A61H 2201/1614; A61H 2201/1616; A61H 2201/1652;
(Continued)

(56) References Cited

U.S. PATENT DOCUMENTS 4,060,079 A 11/1977 Reinhold, Jr.
4,198,963 A * 4/1980 Barkalow ......... A61M 16/0409 128/207.15

(Continued)

FOREIGN PATENT DOCUMENTS

GB 1187274 A * 4/1970 .......... A61H 31/007

OTHER PUBLICATIONS

U.S. Appl. No. 17/844,380, filed Jun. 20, 2022.
U.S. Appl. No. 17/844,392, filed Jun. 20, 2022.

*Primary Examiner* — Brandy S Lee
*Assistant Examiner* — Sydney Reyes Russell
(74) *Attorney, Agent, or Firm* — Howard & Howard Attorneys PLLC

(57) ABSTRACT

A patient care system for treating a patient is provided. The patient care system includes a patient transport apparatus, a chest compression system configured to provide automatic chest compressions to a patient, and a retainer for securing the chest compression system to the patient. The patient transport apparatus includes a base, an intermediate frame arranged for movement relative to the base, and a patient support deck which defines a patient support surface. The chest compression system includes a driver having a driver body movably supporting a plunger, and a driver frame to support the driver adjacent to the chest of the patient. The retainer includes a collar releasably engageable with the chest compression system, and a brace including a shoulder support and a retainer frame. The shoulder support is arranged to abut a shoulder of the patient and to brace the chest compression system relative to the patient.

18 Claims, 7 Drawing Sheets

(52) U.S. Cl.
CPC ................ *A61H 2201/1616* (2013.01); *A61H 2201/1638* (2013.01); *A61H 2201/1652* (2013.01); *A61H 2201/1664* (2013.01); *A61H 2203/0456* (2013.01); *A61H 2205/084* (2013.01)

(58) Field of Classification Search
CPC ...... A61H 2205/084; A61H 2201/1623; A61H 31/007; A61H 31/008; A61H 23/0254; A61H 23/006; A61H 2201/1619–163; A61H 1/006–008
See application file for complete search history.

(56) References Cited

U.S. PATENT DOCUMENTS

| | | | | |
|---|---|---|---|---|
| 6,055,988 | A | 5/2000 | Perisho | |
| 6,059,742 | A * | 5/2000 | Palmer | A61H 31/02 601/106 |
| 7,226,427 | B2 | 6/2007 | Steen | |
| 7,398,571 | B2 | 7/2008 | Souke et al. | |
| 10,092,464 | B2 * | 10/2018 | Hardig | A61H 31/006 |
| 10,568,805 | B2 | 2/2020 | Illindala | |
| 10,987,268 | B2 | 4/2021 | Souke et al. | |
| 11,103,277 | B2 | 8/2021 | Arnold et al. | |
| 2014/0276269 | A1 * | 9/2014 | Illindala | A61H 31/004 601/41 |
| 2014/0323816 | A1 | 10/2014 | Soderberg et al. | |
| 2016/0095765 | A1 | 4/2016 | Ehrstedt et al. | |
| 2016/0338904 | A1 * | 11/2016 | Lurie | A61G 13/08 |
| 2017/0156977 | A1 | 6/2017 | Walden et al. | |
| 2018/0303689 | A1 | 10/2018 | Souke et al. | |
| 2019/0029920 | A1 * | 1/2019 | Kostic | A61G 1/048 |
| 2019/0117502 | A1 * | 4/2019 | Arbuck | A61H 31/005 |
| 2019/0274920 | A1 | 9/2019 | Williams | |
| 2021/0186781 | A1 | 6/2021 | Souke et al. | |
| 2021/0196564 | A1 | 7/2021 | Stemple | |
| 2022/0125675 | A1 * | 4/2022 | Ehrstedt | A61H 31/008 |

* cited by examiner

CHEST COMPRESSION SYSTEM RETAINER WITH SHOULDER BRACE FOR USE WITH A PATIENT TRANSPORT APPARATUS

CROSS-REFERENCE TO RELATED APPLICATIONS

The subject patent application claims priority to and all the benefits of U.S. Provisional Patent Application No. 63/291,692, filed on Dec. 20, 2021, the disclosure of which is hereby incorporated by reference in its entirety.

BACKGROUND

Cardiopulmonary resuscitation (CPR) is a lifesaving technique useful in many medical emergencies in which a patient's breathing and/or heartbeat has stopped, such as for example following a heart attack or a near drowning. Chest compressions are a primary aspect of CPR, and involve firmly compressing the chest of the patient to keep oxygenated blood flowing to the brain and other vital organs until more definitive medical treatment can restore a normal heart rhythm. The administration of CPR requires the effort and attention of a caregiver, such an emergency medical technician (EMT), who is consequently generally unable to perform other treatment modalities that may benefit the patient suffering the medical emergency. The caregiver may also need to put themselves in danger in order to administer CPR, such as during ambulatory transport of the patient.

Devices have been developed which provide automatic chest compressions. One such device is the LUCAS™ family of chest compression systems, available from Physio-Control, Inc. This type of chest compression system utilizes a mechanical plunger to provide the chest compressions with the appropriate force and at the appropriate intervals. One notably useful application of the chest compression system is during transport of a patient supported on a patient transport apparatus, such as hospital bed, a stretcher, a cot, and the like. Additionally, it will be appreciated that providing automatic chest compressions during ambulance transport—often associated with high-speed driving, risky maneuvers, and/or hazardous road conditions—may mitigate the need for caregivers to perform CPR while standing unrestrained in a confined space.

Due to the elevation of the patient support surface on which the patient is supported, especially during ambulatory transport, the caregivers or other treating medical professionals may need to closely monitor the stability of the chest compression system (and the patient) supported on the patient transport apparatus, and may need to provide attention to or otherwise manually assist with stabilizing and/or repositioning the chest compression system. As a result, the medical professionals may be inhibited from performing other types of treatment or patient cate. Moreover, in some circumstances, the caregiver may not be able to assist with stabilizing the chest compression system, and may have to attend to other types of treatment or patient care.

A patient care system designed to address one or more of the aforementioned challenges is desired.

SUMMARY

The present disclosure provides a patient care system for treating a patient. The patient care system includes a patient transport apparatus, a chest compression system configured to provide automatic chest compressions to a patient, and a retainer for securing the chest compression system to the patient. The patient transport apparatus includes a base arranged for movement along floor surfaces, an intermediate frame arranged for movement relative to the base between a plurality of vertical configurations, and a patient support deck operatively attached to the intermediate frame which defines a patient support surface for supporting the patient. The chest compression system includes a driver having a driver body movably supporting a plunger arranged for providing chest compressions to the patient. The chest compression system further includes a driver frame with a base driver mount disposed on the patient support surface and lateral driver mounts extending between the base driver mount and the driver body to support the driver adjacent to the chest of the patient. The retainer includes a collar shaped for releasable engagement with the driver of the chest compression system, and a brace including a shoulder support and a retainer frame extending between the collar and the shoulder support. The shoulder support is arranged to abut a shoulder of the patient and to brace the collar, together with the driver of the chest compression system, longitudinally relative to the patient.

BRIEF DESCRIPTION OF THE DRAWINGS

Advantages of the present disclosure will be readily appreciated as the same becomes better understood by reference to the following detailed description when considered in connection with the accompanying drawings, wherein.

DETAILED DESCRIPTION

Figure 1:
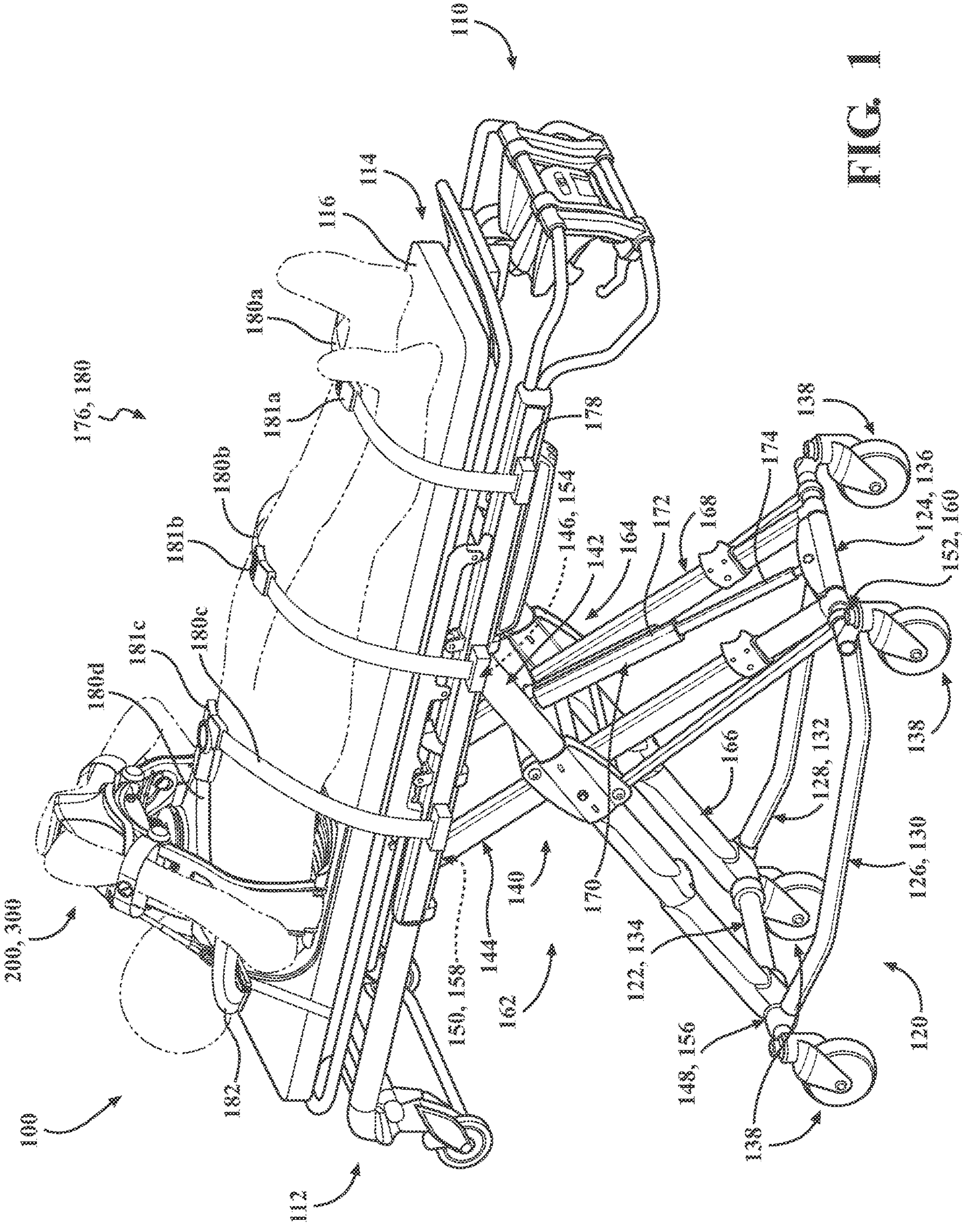
FIG. 1 is a perspective view of a patient care system including a chest compression system secured to a patient transport apparatus by a retainer.

Referring to FIG. 1, a patient care system 100 is shown for treating a patient in a health care and/or transportation setting. The patient care system 100 generally includes a patient transport apparatus 110 for supporting the patient, a chest compression system 200 configured to provide automatic chest compressions to the patient, and a retainer 300 for securing the chest compression system 200 relative to the patient. The patient transport apparatus 110 illustrated in FIG. 1 is realized as a cot. In other versions however, the patient transport apparatus 110 may be a hospital bed, stretcher, table, wheelchair, chair, or similar apparatus utilized in the transportation and care of a patient.

As shown in FIG. 1, the patient transport apparatus 110 includes an intermediate frame 112 configured to support the patient. The intermediate frame 112 may be coupled to a variety of components that aid in supporting and/or transporting the patient. For example, in FIG. 1, the intermediate frame 112 is coupled to a patient support deck 114 defining a patient support surface 116 upon which the patient directly rests. The patient support deck 114 may be defined by one or more articulable deck sections, for example, a fowler deck section, a seat deck section, a leg deck section, and a head deck section, to facilitate care and/or transportation of the patient in various patient positions. The various deck sections have been simplified in the present figures, however, the intermediate frame 112 and corresponding deck sections can be like that shown in U.S. Patent Application Publication No. 2018/0303689 A1, which claims priority to U.S. Provisional Patent Application No. 62/488,441, filed on Apr. 21, 2017, entitled, "Emergency Cot With A Litter Height Adjustment Mechanism," the disclosures of which are hereby incorporated by reference in their entirety.

The patient transport apparatus 110 includes a base 120. As shown in FIG. 1, the base 120 may include two opposing lateral base sides 122, 124 coupled to two opposing longitudinal base sides 126, 128. As shown in FIG. 1, the longitudinal base sides 126, 128 may include longitudinally-extending rails 130, 132 and the lateral base sides 122, 124 may include crosswise-extending rails 134, 136 which may be coupled at the ends thereof to the rails 46, 48.

The base 120 may further include a plurality of caster wheel assemblies 138 operatively connected adjacent to each corner of the base 120 defined by the longitudinally-extending rails 130, 132 and the crosswise-extending rails 134, 136. As such, the patient transport apparatus 110 of FIG. 1 includes four caster wheel assemblies 138. The wheel assemblies 54 may be configured to swivel to facilitate turning of the patient transport apparatus 110. The wheel assemblies 54 may include a swivel locking mechanism to prevent the wheel assemblies 54 from swiveling when engaged. The wheel assemblies 54 may also include wheel brakes (not shown) to prevent rotation of the wheel.

The patient transport apparatus 110 may also include a lift mechanism 140 interposed between the base 120 and the intermediate frame 112. The lift mechanism 140 may be configured to move between a plurality of vertical configurations including an extended configuration where the intermediate frame 112 is elevated relative to the base 120, as shown in FIG. 1, and a retracted configuration (not shown) where the intermediate frame 112 is lowered such that it is in closer proximity to the base 120. The lift mechanism 140 can be like that shown in U.S. Patent Application Publication No. 2018/0303689 A1, incorporated above.

While moving between the plurality of vertical configurations, the lift mechanism 140 moves either the base 120 or the intermediate frame 112 relative to the other of the intermediate frame 112 or the base 120 depending on how the patient transport apparatus 110 is supported during use. For example, the patient transport apparatus 110 may be supported at the intermediate frame 112 when the patient transport apparatus 110 is being unloaded/loaded into an emergency response vehicle (not shown) and the patient transport apparatus 110 may be supported at the base 120 when the patient transport apparatus 110 is resting on a surface such as a hospital floor. In instances where the patient transport apparatus 110 is supported at the intermediate frame 112, the lift mechanism 140, while moving between the plurality of vertical configurations, moves the base 120 relative to the intermediate frame 112. In instances where the patient transport apparatus 110 is supported at the base 120, the lift mechanism 140, while moving between the plurality of vertical configurations, moves the intermediate frame 112 relative to the base 120.

The patient transport apparatus 110 may include a variety of components that allow the lift mechanism 140 to move between the plurality of vertical configurations. For example, the patient transport apparatus 110 may include a mechanism like that shown in U.S. Patent Application Publication No. 2018/0303689 A1, incorporated above.

In FIG. 1, the lift mechanism 140 includes a first frame member 142 and a second frame member 144, both of which are coupled to the intermediate frame 112 and the base 120. More specifically, the first frame member 142 includes a first end 146 pivotably coupled to the head-end of the intermediate frame 112 at a first connection point 154 such that the first frame member 142 may pivot about the first connection point 154. The first frame member 142 also includes a second end 148, which is pivotably coupled to a second connection point 156 such that the first frame member 142 may also pivot about the second connection point 156. Similarly, a first end 150 of the second frame member 144 may be pivotally coupled to the head-end of the intermediate frame 112 at a third connection point 158 such that the second frame member 144 may pivot about the third connection point 158. A second end 152 of the second frame member 144 may be pivotally coupled to a foot-end of the base 120 at a fourth connection point 160 such that the second frame member 144 may also pivot about the fourth connection point 160. Furthermore, a first end 146 of the first frame member 142 may be pivotally coupled to a foot-end of the intermediate frame 112.

As noted above, the first frame member 142 is pivotally coupled to the intermediate frame 112 at the connection point 154. Also shown, a second end 148 of the first frame member 142 may be pivotally coupled to a head-end of the base 120 at a connection point 156 such that the first frame member 142 may pivot about the connection point 156. Furthermore, the first frame member 142 and the second frame member 144 may be pivotally coupled to each other at the pivot axle 83 to form an "X" frame 162.

The lift mechanism 140 may include a second, similarly constructed X frame 164, which may include a third frame member 166 and a fourth frame member 168. Similar to X frame 162, the third frame member 166 and the fourth frame member 168 of X frame 164 may be pivotally coupled to a side of the intermediate frame 112 and a side of the base 120. For example, the third frame member 166 and the fourth frame member 168 of X frame 164 may be pivotally coupled to a side of the intermediate frame 112 and a side of the base 120, which oppose a side of the intermediate frame 112 and a side of the base 120 to which the first frame member 142 and the second frame member 144 are coupled. In one such version, as shown in FIG. 1, X frame 164 is coupled to the intermediate frame 112 and to the base 120, and X frame 162 is coupled to the intermediate frame 112 and to the base 120. It will be appreciated that any reference herein to the first frame member 142 may also be a reference to the third frame member 166. Similarly, any reference to the second frame member 144 may also be a reference to the fourth frame member 168.

In FIG. 1, the frame members 142, 144, 166, 168 are hollow and include telescopic sections such that the length of the frame members 142, 144, 166, 168 may be adjusted. However, in other examples, the frame members 142, 144, 166, 168 may be of solid construction and of a fixed length. Additionally, while the lift mechanism 140 of the representative version illustrated in FIG. 1 includes four frame members 68, 70, 86, 88, the lift mechanism 140 may include any suitable number of frame members.

Those having ordinary skill in the art will appreciate that the lift mechanism 140 may move between the plurality of vertical configurations due to a patient care provider applying a manual action to the lift mechanism 140, or components thereof. Additionally, or alternatively, the patient transport apparatus 110 may include one or more actuators 170, which may be coupled to any suitable component of the lift mechanism 140 and may be configured to move the lift mechanism 140 between the plurality of vertical configurations. As shown in FIG. 1, the illustrated actuator 170 is realized as a hydraulic linear actuator. In this particular version, the hydraulic linear actuator includes a cylindrical housing 172 the cylindrical housing 172 including a reciprocal rod 174 having a piston (not shown) located within the cylindrical housing 172. Extension and retraction of the reciprocal rod 174 will facilitate movement of the frame members 142, 166 of the lift mechanism 140.

The actuator 170 is further described in U.S. Pat. No. 7,398,571, filed on Jun. 30, 2005, entitled, "Ambulance Cot and Hydraulic Elevating Mechanism Therefor," the disclosure of which is hereby incorporated by reference in its entirety. Furthermore, techniques for utilizing actuator 170 to manipulate the components of the patient transport apparatus 110 can be like those described in U.S. Patent Application Publication No. 2018/0303689 A1, incorporated above.

In some versions, the actuator 170 may not be the hydraulic linear actuator shown in FIG. 1. The actuator 170 may be any actuator suitable for actuating the lift mechanism 140 such that the lift mechanism 140 moves between the plurality of vertical configurations. For example, the actuator 170 may be an electric motor, a servo motor, a pneumatic actuator, or any other suitable actuator.

As depicted in the drawings, the patient care system 100 may further include a patient harness assembly 176 for securing the patient to the patient transport apparatus 110. The patient harness assembly 176 includes a plurality of straps 180 for securing the patient to the patient transport apparatus 110. In order to secure the straps 180 to the patient transport apparatus 110 with sufficient strength to secure the patient, harness mounts 178 may be provided coupled to the intermediate frame 112 to secure the straps 180. In some versions, the harness mounts 178 may be realized as multi-piece connectors formed as a part of the straps 180 and/or the intermediate frame 112 and which interlock or otherwise releasably secure to each other. In some versions, the straps 180 may be realized as "loops" of webbing which can be wrapped around, passed through, or otherwise secured with portions of the intermediate frame 112 or other parts of the patient transport apparatus 110. Other configurations are contemplated.

In some versions, the plurality of straps 180 includes leg straps **180*a*, hip straps 180*b*, waist straps 180*c*, and shoulder straps 180*d*. The leg straps 180*a*, the hip straps 180*b*, and the waist straps 180*c* are spaced longitudinally from each other and attach via respective buckles 181*a*, 181*b*, 181*c*. Here, the buckle 181*c* which connects the waist straps 180*c* also releasably secures the shoulder straps 180*d*. It will be appreciated that patient harness assembly 176 may include different configurations and/or arrangements of straps, buckles, and the like. The harness mounts 178 may be movably coupled to the intermediate frame 112 such that they can be adjusted to fit the needs of the patient. Although not explicitly shown in the drawings, it will be appreciated that lengths of the plurality of straps 180 of the patient harness may be adjustable by any suitable length-adjustment apparatus. In some versions, the patient harness assembly 176 may further include a neck strap 182 for supporting the head and neck of the patient. The neck strap 182 may be secured to lateral driver mounts 208 of the chest compression system 200, described in greater detail below. In some versions, the neck strap 182 may be secured to at least one of the plurality of straps 180. Similar to the plurality of straps 180, a length of the neck strap 182 may be adjustable by any suitable length-adjustment apparatus. In this way, the neck strap 182** may be adjusted to meet the needs of the patient and/or the user.

Figure 2:
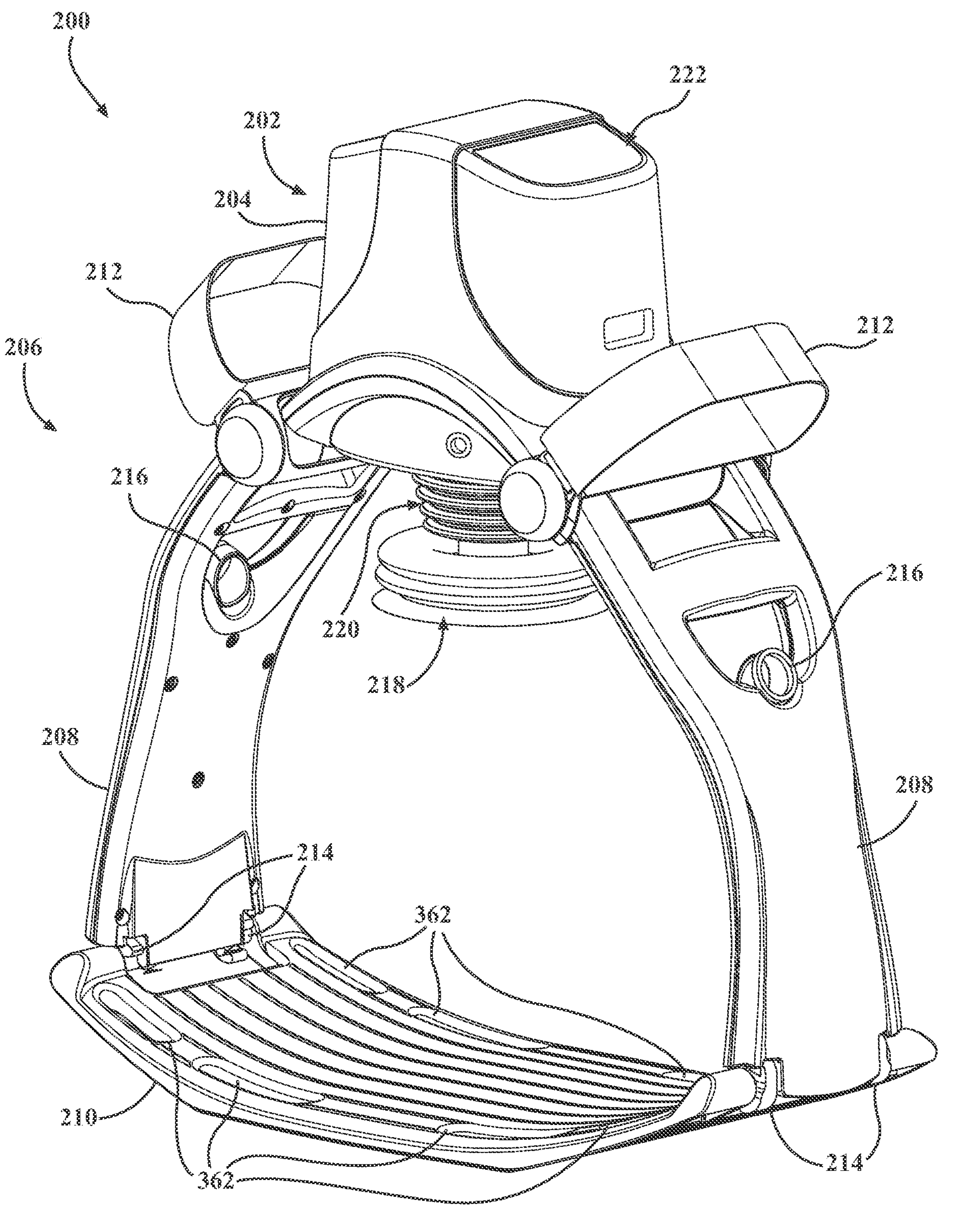
FIG. 2 is a perspective view of the chest compression system.

Now referring to FIG. 2, and as noted above, the patient care system 100 includes the chest compression system 200 for providing automatic chest compressions to the patient. The chest compression system 200 generally includes a driver 202 with a driver body 204 for movably supporting a plunger 218, and a driver frame 206 for supporting the driver 202 adjacent to a chest of the patient. In order to support the driver 202 relative to the chest of the patient, the driver frame 206 includes lateral driver mounts 208 extending between the driver body 204 and a base driver mount 210. The base driver mount 210 is typically disposed on the patient support surface 116 such that the base driver mount 210 is between the patient and the patient support surface 116. In such a configuration, as the driver 202 is providing downward force via the plunger 218, the base driver mount 210 may provide a corresponding upward force. This ensures that the downward force provided by the chest compression system 200 is absorbed by the chest of the patient and is not instead dissipated to, for example, the patient transport apparatus 110 upon which the patient is supported. Handles 212 may also be coupled to the driver frame 206, such as to lateral driver mounts 208, at a suitable position for securing the upper extremities of the patient to, among other things, avoid interference with the operation of the chest compression system 200.

In the illustrated version, the lateral driver mounts 208 of the chest compression system 200 are releasably coupled to the base driver mount 210. Here, the lateral driver mounts 208 may also be pivotably coupled to the base driver mount 210. Additionally, the lateral driver mounts 208 are of a suitable length to at least partially define a patient volume of sufficient size to receive the torso of the patient. At a junction between each of the lateral driver mounts 208 and the base driver mount 210, a locking mechanism 214 may be provided to releasably couple an end of the lateral driver mounts 208 to the base driver mount 210. Consequently, the base driver mount 210 may be separable from the remainder of the chest compression system 200 for various reasons, such as storage, transport, and disengaging the chest compression system 200 from the patient. Here, it will be appreciated that separability of the base driver mount 210 facilitates quick positioning and engagement of the chest compressions system with the patient. During use, the base driver mount 210 may be situated on the patient support surface 116, and the patient may be positioned on top of the base driver mount 210. After the patient has been positioned on the base driver mount 210, other portions of the chest compressions system 200, including the lateral driver mounts 208, are positioned near opposing ends of the base driver mount 210, and the locking mechanisms 214 may then be engaged to retain the lateral driver mounts 208 to the base driver mount 210.

One or both of the locking mechanisms 214 may be disengaged to facilitate adjustment of the chest compression system 200 relative to the patient and/or to facilitate removal of the chest compression system 200 after use. Here, a releasing member 216 coupled to the lateral driver mounts 208 may receive an input from a user to disengage the lateral driver mounts 208 from the base driver mount 210. The illustrated versions show the releasing member 216 as a "ring" configured to be moved upwardly relative to the base driver mount 210 to disengage the locking mechanisms 214. As the releasing member 216 is moved upward, the locking mechanism 214 is rotated out of engagement with at least one of the base driver mount 210 and the lateral driver mounts 208.

It will be appreciated that the driver body 204 and the lateral driver mounts 208 may be formed from separate components that are coupled together, or may be formed integrally in some versions. The driver body 204 houses a number of the electromechanical components of the chest compression system 200, including a piston rod 220 which extends to the plunger 218 as shown in FIG. 2. The piston rod 220 is powered by a motor (not shown) which moves the piston rod 220, and therefore the plunger 218, between retracted positions and extended positions. The plunger 218 may also be actuated with any suitable form of propulsion, for example, electric, electromagnetic, pneumatic, and the like. As the plunger 218 moves between positions while situated on the patient, the patient receives automatic chest compressions analogous to those which would otherwise be provided by a physician performing CPR.

In order to allow the user to control the chest compression system 200, a control panel 222 may be disposed on the driver body 204. The control panel 222 is configured to receive inputs from the user, which may have or facilitate carrying out various functions. For example, start, stop, reset, and similar functions may be used as inputs sent to the chest compression system 200 via the control panel 222. As shown in FIG. 2, the control panel 222 may include depressible buttons to provide these types of inputs. In other versions, the control panel 222 may be remote from the chest compression system 200. For example, the control panel 222 may take the form of a transceiver located anywhere on the chest compression system 200 which receives control signals from a remote source, such as a controller, smartphone, tablet, keyboard, and the like.

Certain operative and structural features of the chest compression system 200 are further disclosed in U.S. Pat. No. 7,226,427, issued Jul. 5, 2007, and entitled SYSTEMS AND PROCEDURES FOR TREATING CARDIAC ARREST, the entire contents of which are hereby incorporated by reference. Additionally, other features of the chest compression system 200 are disclosed in U.S. Patent Application Publication No. 2019/0117502, published Apr. 25, 2019, and entitled PATIENT SUPPORT APPARATUS FOR RELEASABLY SECURING A CHEST COMPRESSION SYSTEM, the entire contents of which are hereby incorporated by reference.

It will be appreciated that, even with the weight of the patient properly positioned on the base driver mount 210, the weight distribution of the chest compression system 200 may render it prone to inadvertent movement on the patient transport apparatus 110, particularly during transport. This type of inadvertent movement may be especially undesirable when the patient care system 100 is situated in an ambulance or other vehicle used to transport the patient care system 100. More specifically, not only must the chest compression system 200 remain located adjacent to the chest of the patient to continue performing chest compressions on the patient, but must also remain retained relative to the patient and to the patient transport apparatus 110 under a number of different use case scenarios and/or operating conditions. Here, the retainer 300 facilitates reliably securing the chest compression system 200 relative to the patient.

Figure 3:
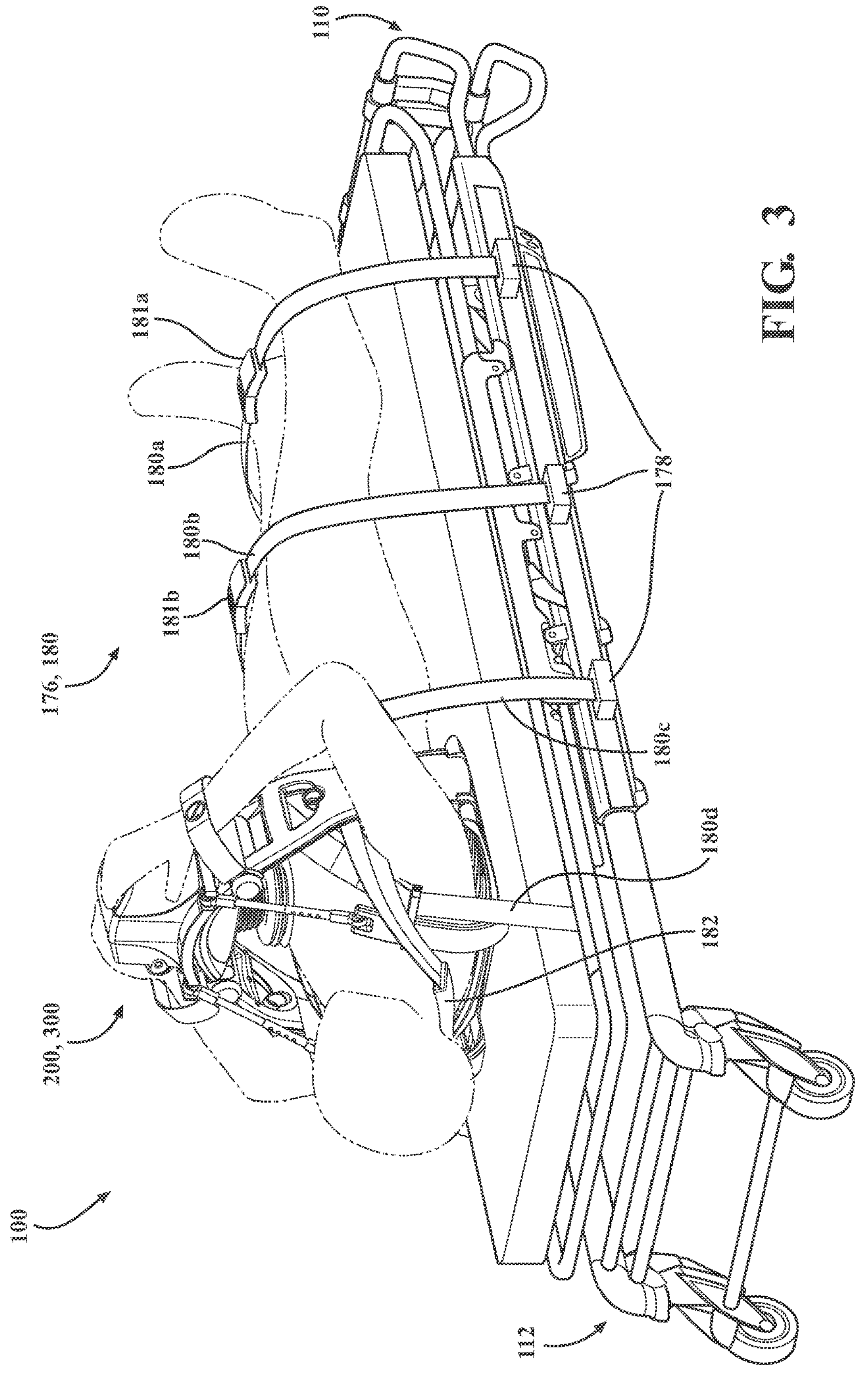
FIG. 3 is a partial view of the patient care system of FIG. 1.
Figure 4:
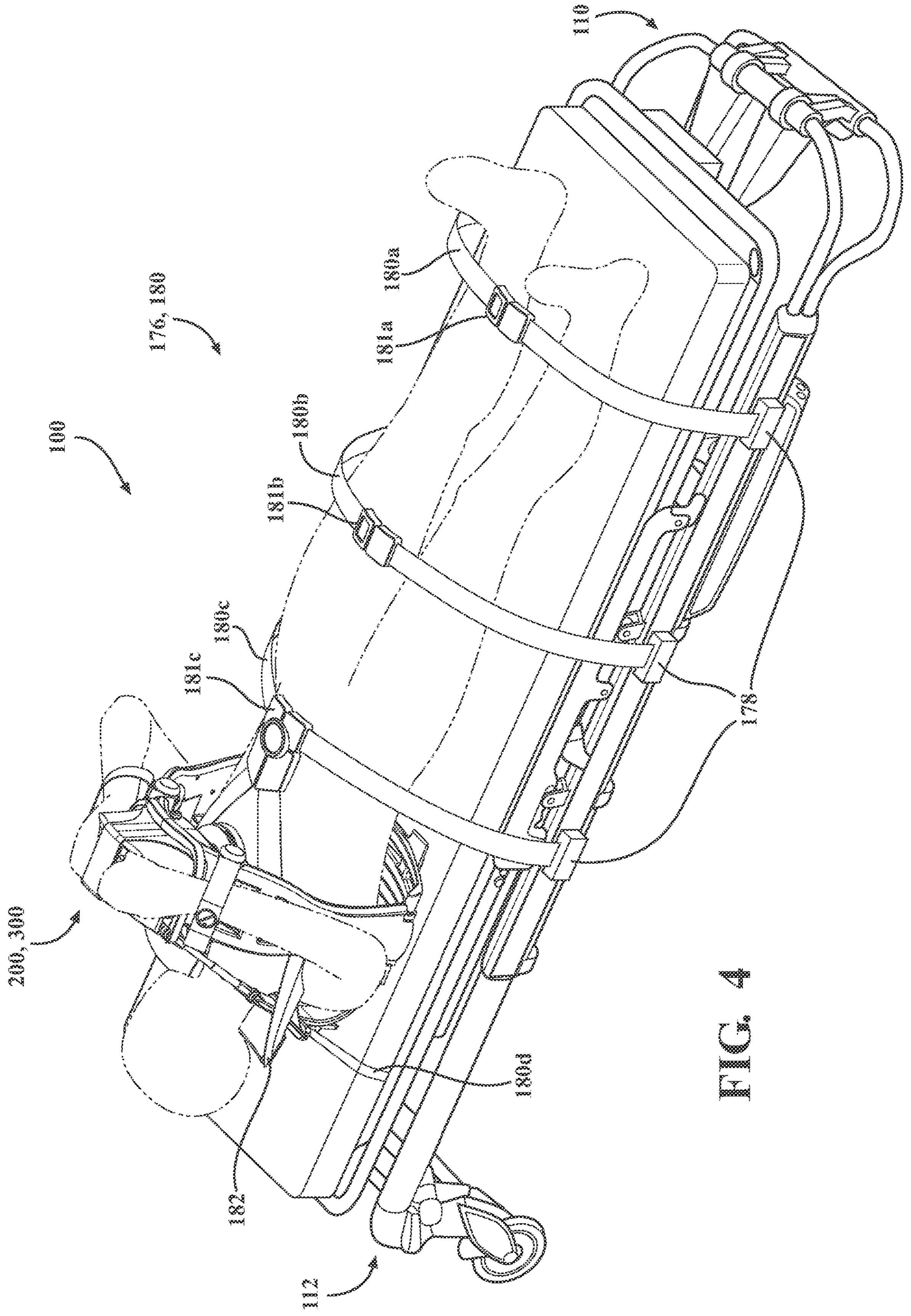
FIG. 4 is an alternative partial view of the patient care system of FIG. 3.
Figure 5:
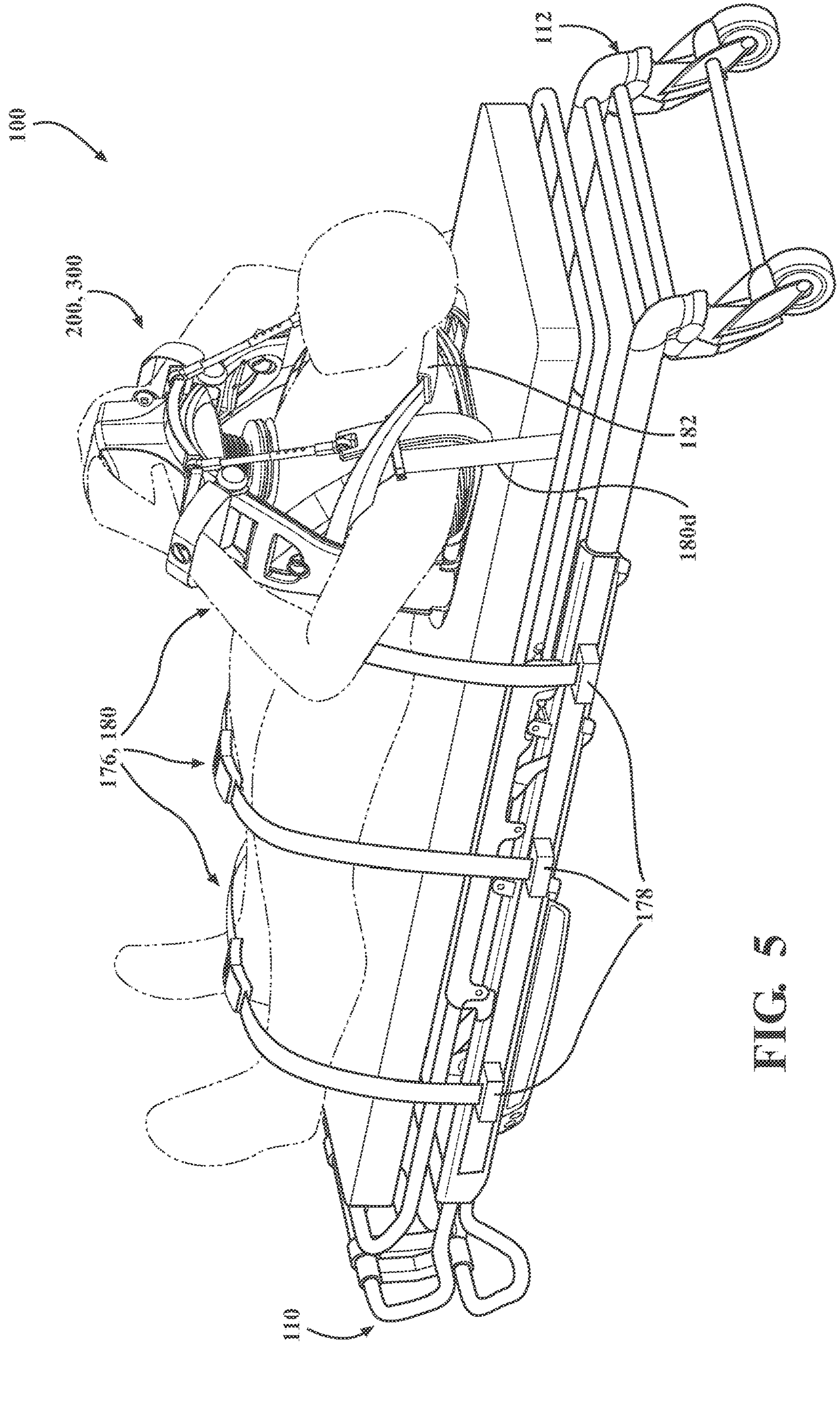
FIG. 5 is an alternative partial view of the patient care system of FIG. 3.

Referring now to FIGS. 3-5, the chest compression system 200 is shown secured relative to the patient by the retainer 300. The retainer 300 includes a collar 302 shaped for releasable engagement with the driver 202 of the chest compression system 200. In the drawings, the collar 302 is depicted with a substantially rectangular profile so as to closely fit over or otherwise correspond to the profile of the driver 202 of the chest compression system 200. In certain versions, however, the collar 302 may be shaped to fit a differently-shaped chest compression system 200.

The retainer 300 includes a brace 304 with shoulder supports 306 and a retainer frame 308 extending between the collar 302 and the shoulder supports 306. The shoulder supports 306 are arranged to abut the shoulders of the patient to brace the collar 302, together with the driver 202 of the chest compression system 200, longitudinally relative to the patient. In order to secure to chest compression system 200 relative to the patient, the collar 302 is brought into releasable engagement with the driver body 204, and the brace 304 is subsequently moved into engagement with the shoulders of the patient and the base driver mount 210.

Referring to FIGS. 6A-7B, the retainer 300 also includes the retainer frame 308 to support the collar 302 relative to the brace 304. The retainer frame 308 extends between the collar 302 and the shoulder supports 306, and may include a first frame member 310 coupled to the shoulder support 306, and a second frame member 312 extending between the first frame member 310 and the collar 302. In some versions, the first frame member 310 may include a first joint 314 at the junction between the first frame member 310 and the shoulder support 306. Similarly, the second frame member 312 may include a second joint 316 at the junction between the second frame member 312 and the collar 302. The first and second joints 314, 316 may be of various styles, types, configurations, and the like which facilitate relative movement between the retainer frame 308 and the collar 302 and/or shoulder supports 306 with at least one degree of freedom. In the illustrated version, the first and second joints 314, 316 are realized as Heim joints that allow two rotational degrees of freedom. In some versions, the shoulder support 306 may include a first shoulder mount 318 supporting the first joint 314, and the collar 302 may include a first collar mount 320 supporting the second joint 316. As described in greater detail below, the shoulder supports 306 may be removably secured to the base driver mount 210 in various ways, and may be adjustable in order to, along with the articulation afforded by the first and second joints 314, 316, facilitate securing the retainer 300 in engagement with patients of varying sizes.

In certain versions, the retainer frame 308 includes a third frame member 322 and a fourth frame member 324. The third frame member 322 is coupled to the shoulder supports 306 at a second shoulder mount 326, and is disposed in spaced relation from the first frame member 310. The fourth frame member 324 extends between the third frame member 322 and is coupled to the collar 302 at a second collar mount 328. Similar to the first and second frame members 310, 312, the third and fourth frame members 322, 324 may include a third joint 330 and a fourth joint 332, respectively. Here, the third joint 330 is arranged at a junction between the third frame member 322 and the shoulder support 306, and the fourth joint 332 is arranged at a junction between the fourth frame member 324 and the collar 302. The third joint 330 may be supported by the second shoulder mount 326, and the fourth joint 332 may be supported by the second collar mount 328.

The retainer frame 308 may further include telescopic sections 334 to permit adjustment of the collar 302 relative to the shoulder supports 306. More specifically, the first and third frame members may define a first detent channel 336 and a second detent channel 338, respectively. Accordingly, the second and fourth frame members 312, 324 may include a first detent mechanism 340 and a second detent mechanism 342, respectively. The detent channels 336, 338 are arranged to receive the respective detent mechanisms 340, 342 to allow the user to adjust the length of the retainer frame 308 and, thus, the height of the collar 302 relative to the shoulder supports 306.

The first and second detent mechanisms 340, 342 include first and second latches 344, 346 arranged for movement along the first and second detent channels 336, 338, respectively. The latches 344, 346 are movably between an engaged position and a disengaged position (not shown in detail). Further, the first and second detent mechanisms 340, 342 include a first plurality of catches 348 and a second plurality of catches 350 defined by the respective first and second frame members 310, 312. The first and second plurality of catches 348, 350 are each arranged for selective engagement with the respective first and second latch to limit relative movement between the frame members 310, 312. More specifically, the first plurality of catches 348 are arranged for selective engagement with the first latch 344 to limit relative movement between the first frame member 310 and the second frame member 312. Similarly, the second plurality of catches 350 are arranged for selective engagement with the second latch 346 to limit relative movement between the third frame member 322 and the fourth frame member 324. As a result, and as noted above, this allows the user to adjust the height of the collar 302 relative to each of the shoulder supports 306.

Figure 7A:
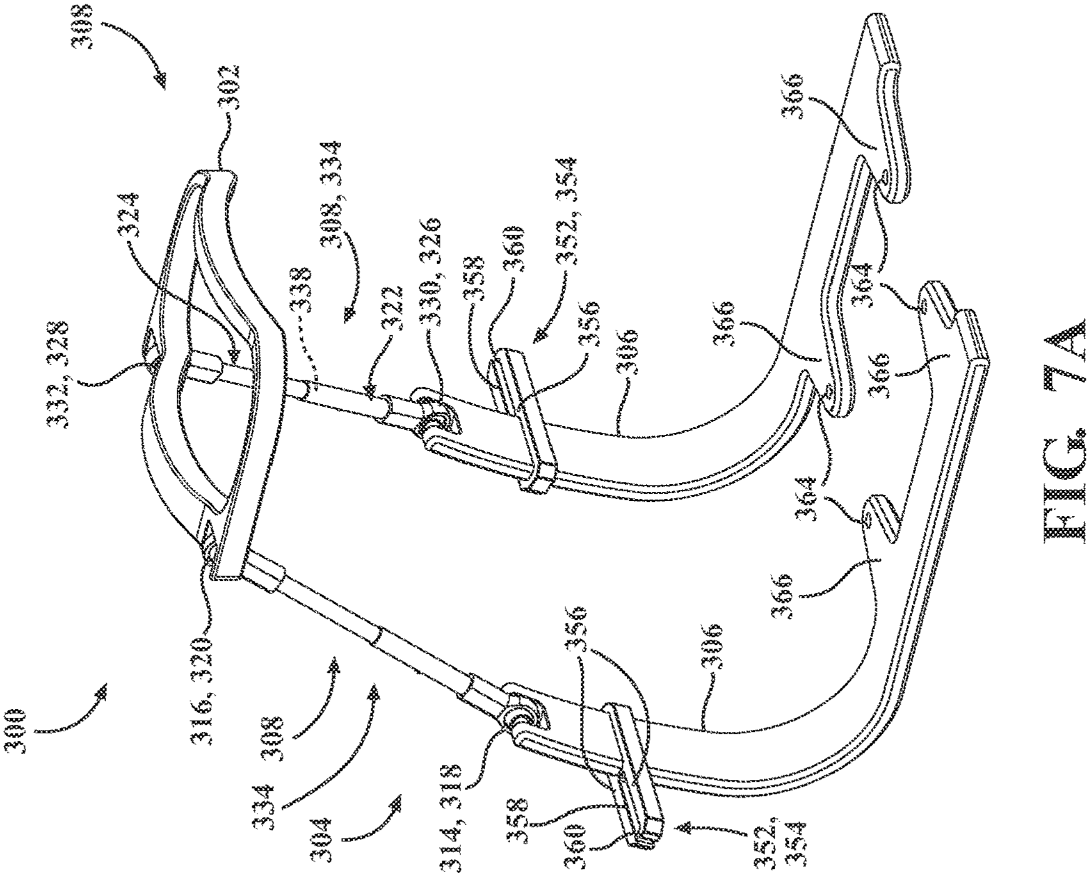
FIGS. 7A-7B are perspective views of the retainer.
Figure 7B:
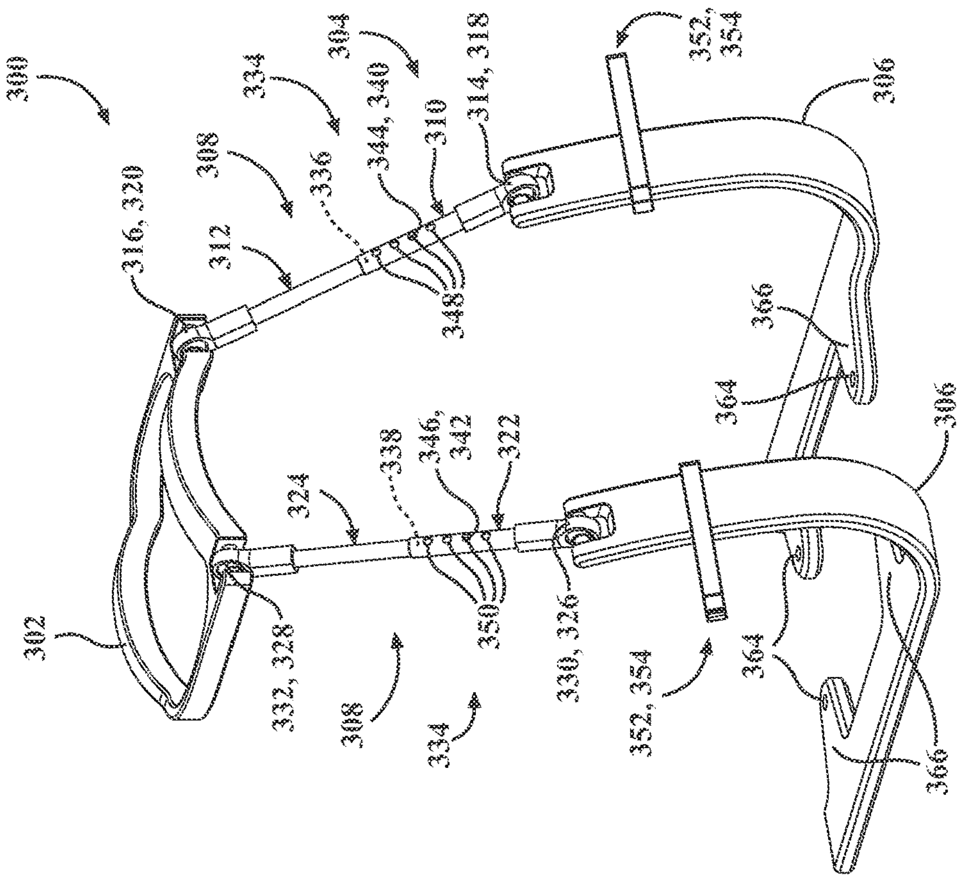

As is best shown by FIGS. 7A and 7B, the retainer 300 may further include harness routing members 352 to route at least a portion of the plurality of straps in spaced relation from the plunger 218 of the chest compression system 200. More specifically, the harness routing members 352 move the shoulder straps 180*d* of the patient harness assembly 176 away from the center of the chest of the patient so that the plunger 218 of the chest compression system 200 does not contact the patient harness assembly 176. In the illustrative versions, the harness routing members 352 are realized as of clips 354 coupled to each of the shoulder supports 306. The clips 354 include clip arms 356 defining channels 358 with openings sized to receive at least a portion of the plurality of straps 180 of the patient harness assembly 176 (e.g., portions of the shoulder straps 180*d*). The harness routing members 352 allow the caregiver to adjust the shoulder straps 180*d* of the patient harness assembly 176 relative to the shoulder(s) of the patient and, thus, allow the retainer 300 to work with different types of patient harness assemblies 176. In the illustrated versions, each clip 354 includes a retaining projection 360 extending from at least one of the clip arms 356 to maintain engagement between at least a portion of the plurality of straps 180 and the clips 354. Once the patient harness assembly 176 is engaged by the clips 354, the retaining projections 360 stop the shoulder straps 180*d* of the patient harness assembly 176 from inadvertently slipping out of the channel 358 defined by the clip arms 356. In some versions, at least one of the clip arms 356 may include a clip latch (not shown in detail) to urge the retaining projection 360 toward the opposing clip arms 356 and facilitate locking the straps 180 of the patient harness assembly 176 into the channels 358 of the clips 354.

Figure 6B:
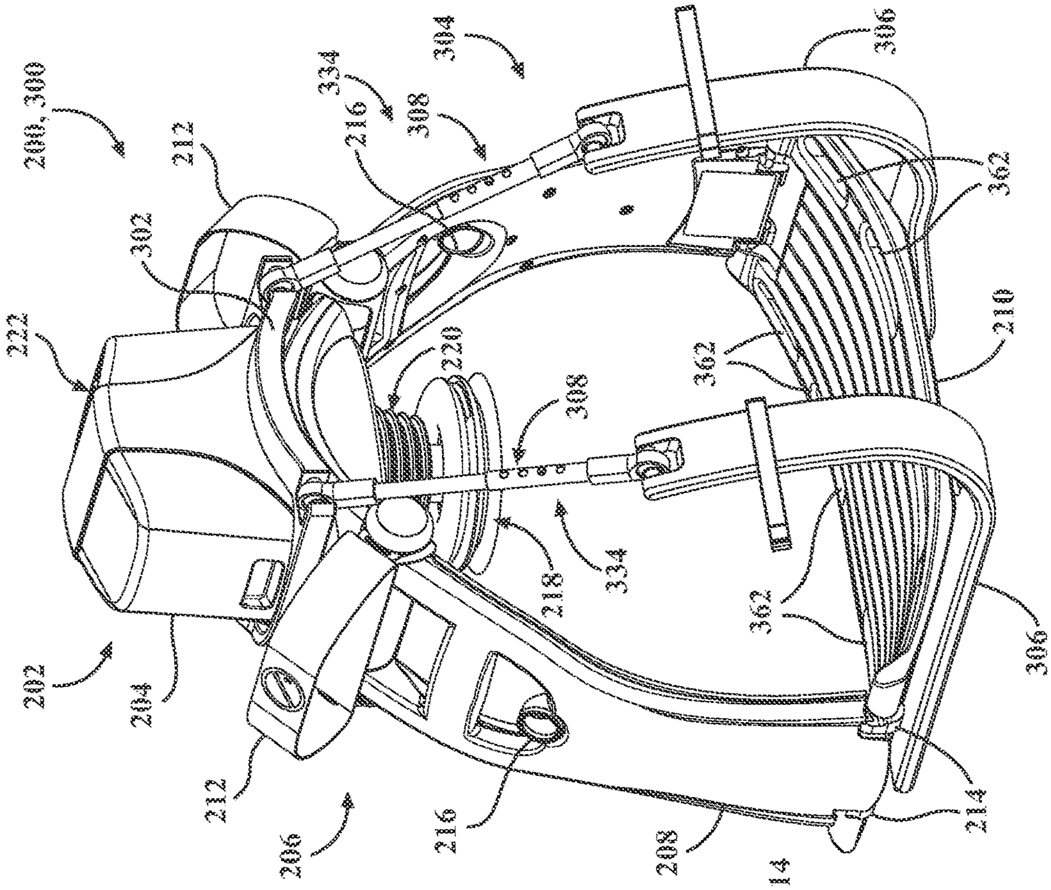
FIGS. 6A-6B are perspective views of the retainer engaged with the chest compression system.
Figure 6A:
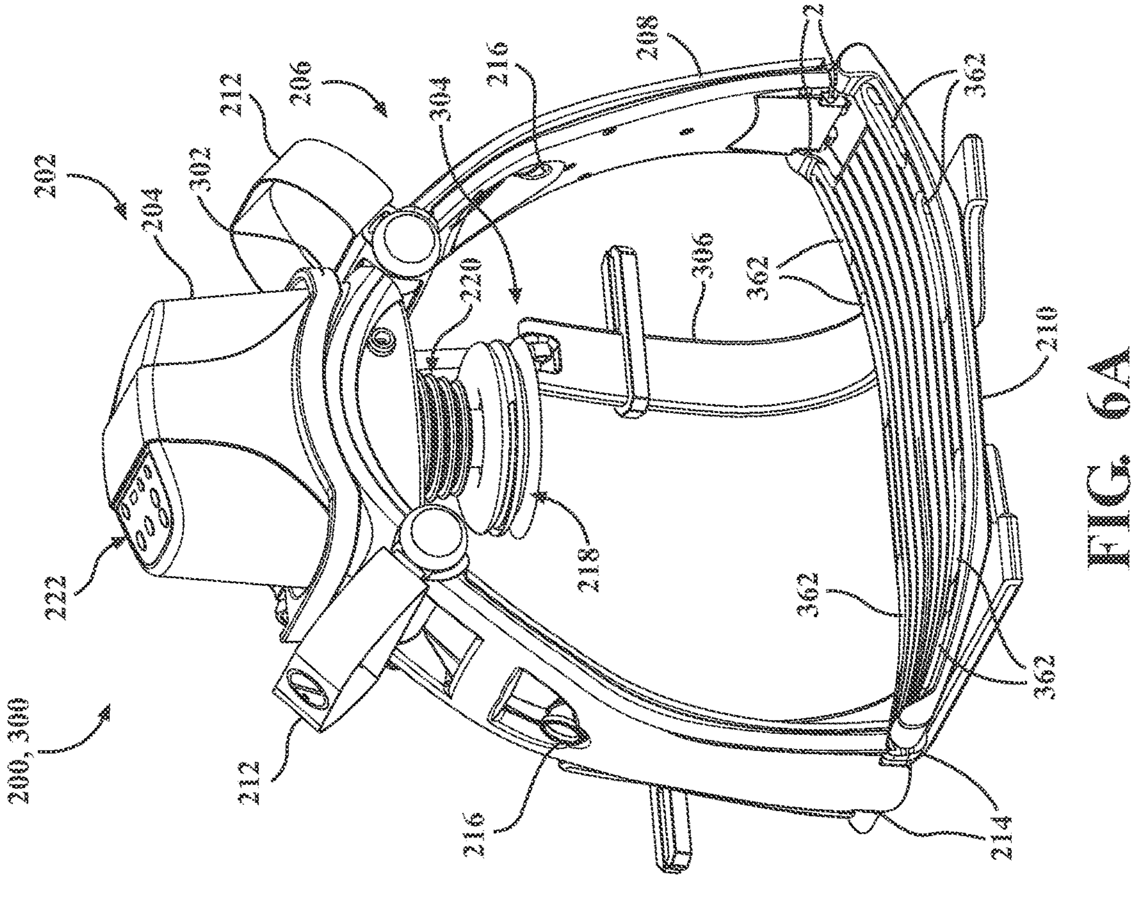

With continued reference to FIGS. 7A and 7B, the shoulder supports 306 may removably couple to the base driver mount 210. To this end, the base driver mount 210 may include base apertures 362, and the shoulder supports 306 may include support apertures 364, and fasteners such as screws (not shown) may be disposed extending through the base apertures 362 and into the support apertures 364. As depicted in FIGS. 6A-6B, the base apertures 362 may be elongated such that the shoulder supports 306 may be secured to the base driver mount 210 in various arrangements. If the patient has relatively wide shoulders, for example, the shoulder supports 306 may be secured to the base driver mount 210 at ends of the base apertures 362 closer to the respective lateral driver mounts 208. The base driver mount 210 may also include periphery base apertures 362 between the base apertures 362 and the lateral driver mounts 208. The periphery base apertures 362 allow the shoulder supports 306 to be further adjusted to fit larger patients. Depending on the anatomy of the patient, the shoulder supports 306 may be secured to the base driver mount 210 by any combination of base apertures 362 and periphery base apertures 362. Other configurations are contemplated.

In order for the retainer 300 to secure the chest compression system 200 to the patient transport apparatus 110 with adequate strength to withstand the forces of transport or vehicular collision, the retainer 300 may be at least partially formed of a suitably rigid material. Similarly, the collar 302 must be able to withstand the aforementioned forces and may be at least partially formed of a suitably rigid material. The brace 304 and/or collar 302 may be formed of metal, rigid plastic or polymers, combinations thereof, and the like. Further, in some versions, the collar 302 may be at least partially formed of a suitably resilient material in order to permit limited, resilient movement between the driver body 204 and the shoulder supports 306. In some versions, the collar 302 may be manufactured from elastomers, such as rubber. Other configurations are contemplated.

It will be appreciated that certain components of the retainer 300 may be formed integrally, or may be realized as separate components. For example, the shoulder supports 306 could be unitarily formed. Referring to FIGS. 7A and 7B, the shoulder supports 306 include projections 366 which define the support apertures 364. Instead, these projections 366 may extend from one shoulder support 306 to the other such that the shoulder supports 306 are unitarily formed. In such versions, the shoulder supports 306 may be removably secured to the base driver mount 210 at common locations. In other words, the support apertures 364 may support both shoulder supports 306, when fastened to the base driver mount 210, by nature of their unitary construction. The retainer frame 308 may also embody a singular construction such that the first and second frame members 310, 312 and/or third and fourth frame members 322, 324 are at least partially unitarily formed as integral frame members (not shown), which may include the joints and/or the telescopic sections as previously described. Other configurations are contemplated.

It will be further appreciated that the terms "include," "includes," and "including" have the same meaning as the terms "comprise," "comprises," and "comprising." Moreover, it will be appreciated that terms such as "first," "second," "third," and the like are used herein to differentiate certain structural features and components for the non-limiting, illustrative purposes of clarity and consistency.

Several configurations have been discussed in the foregoing description. However, the configurations discussed herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

What is claimed is:

1. A patient care system for treating a patient, the patient care system comprising:

a patient transport apparatus including:

a base arranged for movement along floor surfaces, an intermediate frame arranged for movement relative to the base between a plurality of vertical configurations, and a patient support deck operatively attached to the intermediate frame and defining a patient support surface for supporting the patient;

a patient harness assembly including a plurality of straps configured to secure the patient to the patient support surface;

a chest compression system configured to provide automatic chest compressions to a patient, the chest compression system including:

a driver having a driver body movably supporting a plunger arranged for providing chest compressions to the patient, and a driver frame with a base driver mount disposed on the patient support surface and lateral driver mounts extending between the base driver mount and the driver body to support the driver adjacent to the chest of the patient; and a retainer for securing the chest compression system to the patient, the retainer including:

a collar shaped for releasable engagement with the driver of the chest compression system, a brace including a shoulder support and a retainer frame extending between the collar and the shoulder support, the shoulder support arranged to abut a shoulder of the patient to brace the collar, together with the driver of the chest compression system, longitudinally relative to the patient, and a harness routing member to route at least a portion of one of the plurality of straps spaced from the plunger of the chest compression system.

2. The patient care system of claim 1, wherein the harness routing member includes a clip defining a channel shaped to receive at least a portion of one of the plurality of straps.

3. The patient care system of claim 2, wherein the harness routing member further includes a retaining projection to maintain engagement between the at least a portion of one of the plurality of straps and the clip.

4. The patient care system of claim 1, wherein the retainer frame includes a telescopic section to facilitate selectively adjusting the collar relative to the shoulder support.

5. The patient care system of claim 1, wherein the retainer frame includes:

a first frame member coupled to the shoulder support; and a second frame member extending between the first frame member and the collar.

6. The patient care system of claim 5, wherein the first frame member defines a first detent channel, and the second frame member includes a first detent mechanism having:

a first latch arranged for movement along the first detent channel between an engaged position and a disengaged position, and a first plurality of catches defined by the first frame member each arranged for selective engagement with the first latch to limit relative movement between the first frame member and the second frame member.

7. The patient care system of claim 5, wherein the retainer frame further includes:

a third frame member coupled to the shoulder support and disposed in spaced relation from the first frame member, and a fourth frame member extending between the third frame member and the collar and disposed in spaced relation from the second frame member.

8. The patient care system of claim 7, wherein the third frame member defines a second detent channel, and the fourth frame member includes a second detent mechanism, the second detent mechanism including:

a second latch arranged for movement along the second detent channel between an engaged position and a disengaged position, and a second plurality of catches defined by the third frame member each arranged for selective engagement with the second latch to limit relative movement between the third first frame member and the fourth frame member.

9. The patient care system of claim 1, wherein the retainer frame includes a first joint and a second joint, the shoulder support defines a first shoulder mount configured to receive the first joint, and the collar defines a first collar mount configured to receive the second joint.

10. The patient care system of claim 9, wherein the retainer frame is pivotable relative to the collar.

11. The patient care system of claim 9, wherein the retainer frame is pivotable relative to the shoulder support.

12. The patient care system of claim 9, wherein the retainer frame is pivotable relative to the collar and the retainer frame is pivotable relative to the shoulder support, such that the shoulder support is pivotable relative to the collar; and wherein the retainer secures the chest compression system to the patient when the collar is moved into engagement with the drive of the chest compression system and the shoulder support is subsequently pivoted relative to the collar so that the shoulder support abuts the shoulder of the patient.

13. The patient care system of claim 1, wherein the retainer frame comprises:

a first frame member coupled to the shoulder support and including a first joint, a second frame member extending between the first frame member and the collar and including a second joint, a third frame member coupled to the shoulder support and disposed in spaced relation from the first frame member and including a third joint, and a fourth frame member extending between the third frame member and the collar and disposed in spaced relation from the second frame member and including a fourth joint; and wherein the shoulder support defines a first shoulder mount configured to receive the first joint and the shoulder support further defines a second shoulder mount disposed in spaced relation from the first shoulder mount and configured to receive the third joint, and the collar defines a first collar mount configured to receive the second joint and the collar further defines a second collar mount disposed in spaced relation to the first collar mount and configured to receive the fourth joint.

14. The patient care system of claim 1, wherein the collar is formed a rigid material.

15. The patient care system of claim 1, wherein the collar is substantially rectangular.

16. The patient care system of claim 1, wherein the collar is substantially circular.

17. The patient care system of claim 1, wherein the shoulder support is removably coupled to the base driver mount.

18. A patient care system for treating a patient, the patient care system comprising:

a patient transport apparatus including:

a base arranged for movement along floor surfaces, an intermediate frame arranged for movement relative to the base between a plurality of vertical configurations, and a patient support deck operatively attached to the intermediate frame and defining a patient support surface for supporting the patient;

a chest compression system configured to provide automatic chest compressions to a patient, the chest compression system including:

a driver having a driver body movably supporting a plunger arranged for providing chest compressions to the patient, and a driver frame with a base driver mount disposed on the patient support surface and lateral driver mounts extending between the base driver mount and the driver body to support the driver adjacent to the chest of the patient; and a retainer for securing the chest compression system to the patient, the retainer including:

a collar shaped for releasable engagement with the driver of the chest compression system, and a brace including a shoulder support and a retainer frame extending between the collar and the shoulder support, the shoulder support arranged to abut a shoulder of the patient to brace the collar, together with the driver of the chest compression system, longitudinally relative to the patient, wherein the retainer frame includes a first joint and a second joint, the shoulder support defines a first shoulder mount configured to receive the first joint, and the collar defines a first collar mount configured to receive the second joint.

* * * * *